Sept. 21, 1954 K. N. BERGAN 2,689,882

TELEPHONE TERMINAL EQUIPMENT

Filed Nov. 17, 1949 4 Sheets-Sheet 1

INVENTOR.
KENNETH N. BERGAN
BY Foorman L. Mueller
ATTY.

Sept. 21, 1954 K. N. BERGAN 2,689,882

TELEPHONE TERMINAL EQUIPMENT

Filed Nov. 17, 1949 4 Sheets-Sheet 2

*INVENTOR.*
KENNETH N. BERGAN

*BY* Foorman L. Mueller

ATTY.

Sept. 21, 1954 K. N. BERGAN 2,689,882

TELEPHONE TERMINAL EQUIPMENT

Filed Nov. 17, 1949 4 Sheets-Sheet 3

INVENTOR.
KENNETH N. BERGAN
BY
Foorman L. Mueller
ATTY.

Sept. 21, 1954 K. N. BERGAN 2,689,882

TELEPHONE TERMINAL EQUIPMENT

Filed Nov. 17, 1949 4 Sheets-Sheet 4

INVENTOR.
KENNETH N. BERGAN
BY
Foorman L. Mueller
ATTY.

Patented Sept. 21, 1954 2,689,882

UNITED STATES PATENT OFFICE 2,689,882

TELEPHONE TERMINAL EQUIPMENT

Kenneth N. Bergan, Franklin Park, Ill., assignor to Motorola, Inc., Chicago, Ill., a corporation of Illinois Application November 17, 1949, Serial No. 127,815

18 Claims. (Cl. 179—15.5)

This invention relates generally to communication systems and more particularly to a multiplex communication system in which a plurality of communications take place simultaneously over a single channel.

Multiplex communication systems have been used both for wire and radio communication in which a plurality of signals are simultaneously transmitted over a single channel. To prevent interference of the various signals, means are provided for dividing the channel so that the various signals may thereby be separated. In one such system the channel space is divided into a plurality of frequency bands for the individual signals. This application relates to a system of this type, which is generally designated a frequency division multiplex system. In this system subcarrier waves are modulated by the separate signals so that the signals may be individually recovered.

In the use of the channels of multiplex systems in telephone systems, difficulty results from the fact that direct currents which are normally used for providing controls in telephone systems are not easily transmitted. For example, it may be desirable to use a channel of a multiplex radio communication system to provide party line or dial telephone service. A party line system may be particularly applicable in a radio relay system having a plurality of stations as, by use of a party line, a single channel can provide a complete communication system interconnecting the various stations. It may also be desirable to interconnect various stations in the relay system to a standard dial telephone system. In such systems it is necessary to transmit signals for signalling and automatic switching in addition to the audio signals.

It is an object of the present invention to provide a multiplex communication system for transmission of audio frequency signals and control signals so that the multiplex system can be used to provide the types of service offered by standard telephone wire systems.

A further object of this invention is to provide a multiple channel radio relay system in which a single narrow channel may be used to provide a party line telephone system interconnecting the stations of the relay system.

A still further object of this invention is to provide a radio communication system which can be coupled to a standard dial telephone system so that the radio link functions as a branch of the dial telephone system.

A feature of this invention is the provision of a multiplex communication system including frequency modulation sub-carrier transmitters and receivers having special provisions so that a control voltage applied to the transmitter provides a frequency shift thereof which is translated in the receiver to provide a control.

Another feature of this invention is the provision of terminal units for connecting subcarrier transmitters and receivers of a multiplex communication system to telephone subsets so that party line communication may be provided therebetween.

A further feature of this invention is the provision of terminal units for connecting a dial telephone switchboard and a dial telephone substation to the subcarrier receivers and transmitters of a multiplex communication system whereby the multiplex communication system operates as a part of the dial telephone system.

Further objects, features and advantages will be apparent from a consideration of the following description when taken in connection with the accompanying drawings in which.

In practicing the invention there is provided a multiplex radio relay communication system including a pair of terminal stations and a plurality of intermediate relay stations. This system may operate at microwave frequencies with the microwave transmitted being modulated by a plurality of subcarrier waves. Each of the subcarrier waves may be modulated by an audio wave so that a plurality of audio signals may be simultaneously transmitted. In the radio relay operation the microwave frequency may be demodulated at each relay station to provide the various subcarrier waves but the subcarrier waves will not be demodulated unless it is desired to obtain information from one of the channels at the relay station. The subcarrier transmitters are of the frequency modulation type and are designed so that a bias voltage may be applied thereto to cause a shift in the output frequency thereof. This wide frequency shift is translated by the subcarrier receiver into a control which may be used in a number of ways which will be described. Party line terminals are provided which may be connected to the subcarrier receivers and transmitters at the stations for providing a party line communication system between the various stations. The radio communication system can be used in a dial telephone system for connecting a dial substation to a dial switchboard. A plurality of channels may be provided in the multiplex radio relay system and these channels may be used in various ways for carrying the desired signals.

Figure 1:
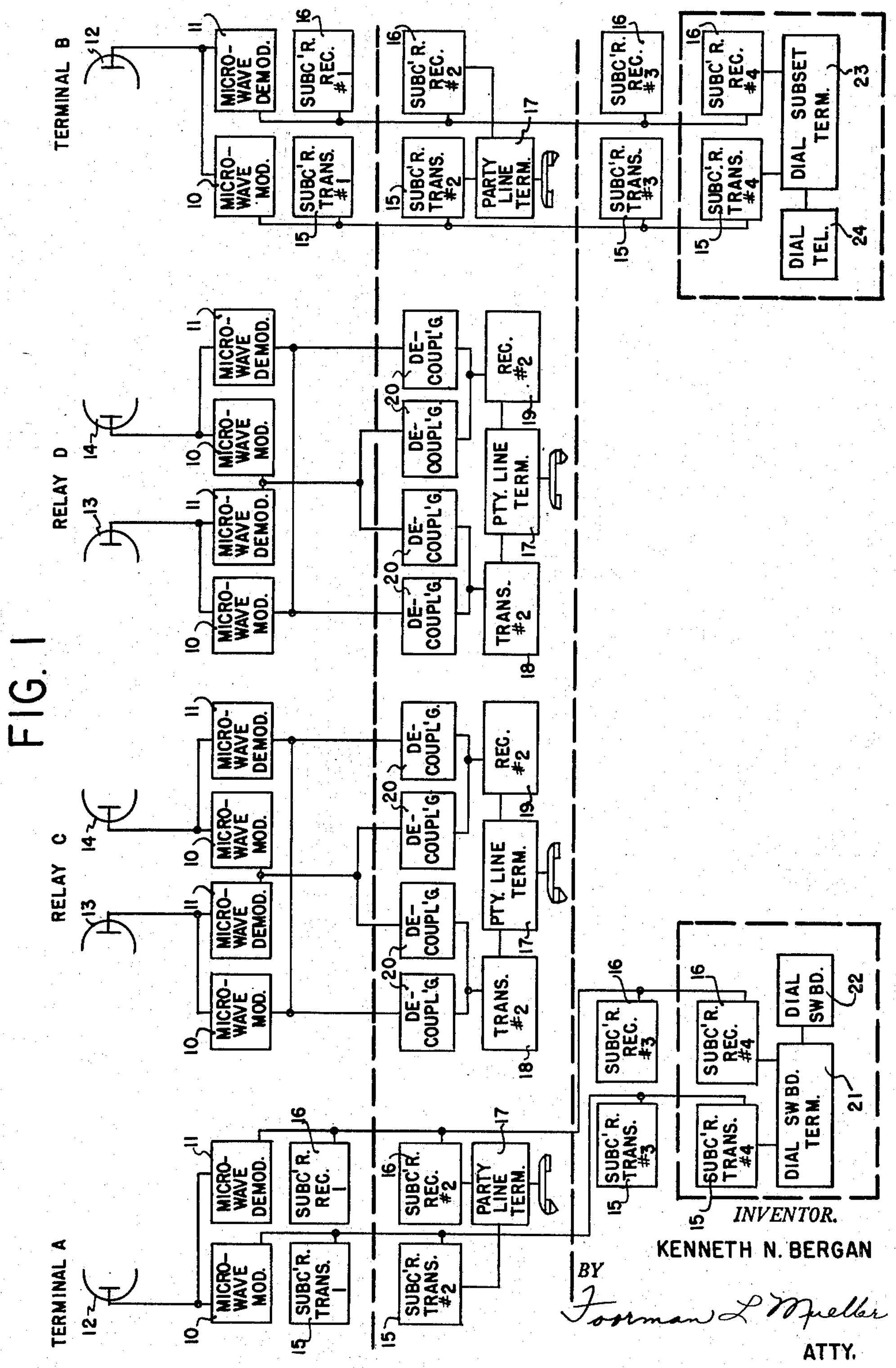
Fig. 1 illustrates in block diagram form a complete communication system in accordance with the invention.

Referring now to the drawings, in Fig. 1 there is illustrated a system including terminal stations A and B and relay stations C and D. The terminal stations include a microwave modulator 10 and a microwave demodulator 11 for communication with an adjacent relay station. Each of the relay stations includes two microwave modulators 10 and two microwave demodulators 11 so that simultaneous two-way communication can be carried on. The system as disclosed includes a single antenna 12, at each terminal station which is used for both transmitting and receiving and separate antennas 13 and 14 for communicating in the two directions from a relay station.

As previously stated the microwave transmission may include a wide band of frequencies so that the transmitted microwave carriers may be modulated by a plurality of subcarrier waves each of which is modulated by a separate audio wave. Accordingly, subcarrier transmitters and receivers 15 and 16 are required at each terminal station for transmitting and receiving signals therefrom. At the relay stations the subcarrier signals need not be selected and demodulated but may be retransmitted to the succeeding link so that the transmission proceeds along the various links of the relay system. However, it may be desired to provide communication with a relay station and this may be accomplished by picking off one or more channels at the relay station.

In the system of Fig. 1 the signal transmitted on channel 1, which modulates the subcarrier transmitter No. 1 and which is received on the subcarrier receiver No. 1, is not picked out at the relay stations but is simply retransmitted from the microwave demodulator of one link to the microwave modulator of the next link in the relay system. Channel 2 is used to provide party line operation between the stations of the relay system with a party line terminal 17 being connected to the subcarrier transmitter and receiver at each station which operates on channel 2. At the relay stations, the party line terminals 17 are connected to subcarrier transmitters 18 and receivers 19 which are connected to the microwave equipment for communicating in both directions through decoupling networks 20. This permits the use of a single subcarrier receiver and transmitter at each relay station. Channels 3 and 4 in the multiplex system are retransmitted at the relay stations without being demodulated. Channel 4 is illustrated as being used for extending a dial telephone system with the channel 4 subcarrier transmitter and receiver at terminal A being connected to dial switchboard terminal 21 which is in turn connected to a dial switchboard 22. The channel 4 subcarrier transmitter and receiver at terminal B are connected to dial subset terminal 23 which is in turn connected to a dial subset 24.

Figure 2:
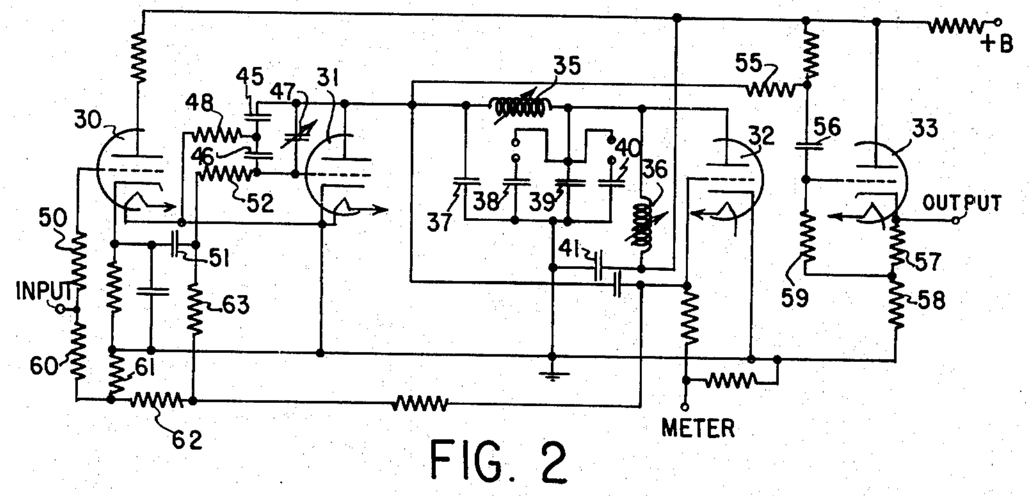
Fig. 2 is a circuit diagram of a subcarrier transmitter.

In Fig. 2 there is illustrated the circuit diagram of the subcarrier transmitter which includes the triode valves 30, 31, 32 and 33. The first triode 30 functions as an input limiter, the triode 31 as a reactance modulator, the triode 32 as an oscillator, and the triode 33 as a cathode follower output stage. Considering first the oscillator, the inductors 35 and 36 and the capacitors 37, 38, 39, 40 and 41 provide the oscillator frequency controlling tank circuit. By selectively including capacitors 38, 39, and 40, operation at various frequencies can be provided. The inductances 35 and 36 both affect the amplitude and the frequency of the oscillator and by proper adjustment the desired amplitude and frequency can both be obtained. The reactance tube 31 changes the reactance of the oscillator tank circuit because of the operation of the phase shifting network including condensers 45, 46 and 47 and resistor 48. The condenser 47 is variable to adjust for variation in the capacity of the particular tube used. The voltage at the plate of the reactance tube 31 is the output voltage of the oscillator. The plate current of the tube 31 will lead this voltage by 90 degrees, thus presenting a capacitive reactance in parallel with a portion of the oscillator tank circuit to thereby change the reactance of the tank circuit and the frequency of oscillation. The magnitude of the plate current depends upon the bias voltage applied to the grid of the tube 31 so that by applying the modulating voltage to this grid the amount of change of the frequency of the oscillator is controlled.

The audio signal is applied to the grid of the reactance tube through the limiter tube 30 which limits the peaks of the signal applied thereto. The input signal is applied to the limiter grid through resistor 50 and the output is taken from the cathode of the limiter tube 30 which is coupled to the grid of the reactance tube 31 through condenser 51 and resistor 52. The modulated output of the oscillator 32 is applied through resistor 55 and condenser 56 to the grid of the cathode follower output stage 33. The oscillator output voltage is divided by resistors 57 and 58 to which the oscillator output is applied through resistor 59. The transmitter output is derived from the cathode of the cathode follower 33.

The input circuit to the reactance modulator includes an arrangement for applying a direct current bias thereto for shifting the frequency of the oscillator. A direct current voltage applied to the input terminal is divided by resistors 60 and 61 with the portion appearing across resistor 61 being applied through resistors 62, 63 and 52 to the grid of the reactance modulator. The values of resistance should be so selected that the frequency shift of the oscillator 32 provided by the positive bias applied at the input will be greater than the frequency shift resulting from modulation of the signal applied. Application of the bias therefore provides a continuous off frequency output from the transmitter.

Figure 3:
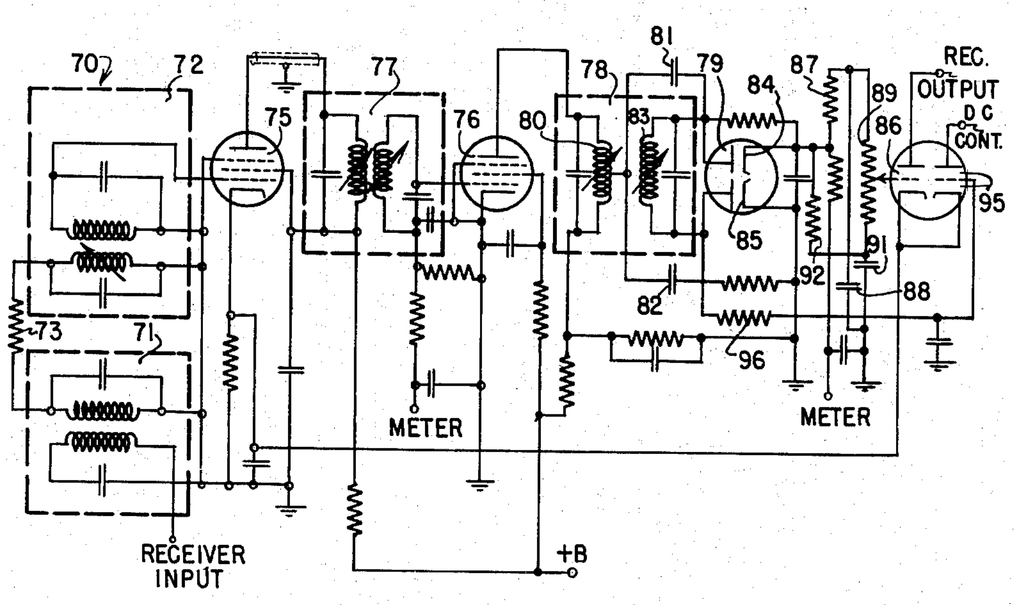
Fig. 3 is a circuit diagram of a subcarrier receiver.

In Fig. 3 there is illustrated a subcarrier receiver which cooperates with the subcarrier transmitter of Fig. 2 to derive modulation from the frequency modulated carrier wave and to provide a control in response to the application of the bias voltage to the subcarrier transmitter of Fig. 2. The subcarrier receiver includes a tuned input circuit 70 which is effective to select a particular subcarrier wave. The input circuit includes two double tuned circuits 71 and 72 coupled by a resistor 73. The tuned circuits 71 and 72 are each critically coupled or slightly over coupled with the circuit 72 having a lower impedance than the circuit 71 so that energy is transferred from the circuit 71 to the circuit 72. The resistor 73, in addition to providing the desired coupling, also loads the tuned circuits to provide a substantially uniform response over the desired band. The selected signal is amplified by the pentode valve 75 and limited by the pentode valve 76. The amplifier stage may be of a standard design which produces a high gain. The amplified signal is applied through transformer 77 to the limiter 76 which provides both plate and grid limiting.

The output from the limiter 76 is applied to a discriminator including the tuned circuit 78 and the double diode 79. The discriminator is of the Seeley-Foster type which is arranged to provide wide band pass characteristic. The desired voltage relationships in the discriminator are provided by placing the tap on the primary coil 80 of the transformer of the tuned circuit 78 approximately three-quarters of the length of the coil from the end connected to the limiter 76. This tap on the primary coil 80 is connected to the center point between condensers 81 and 82 which are bridged across the secondary coil 83. Quadrature voltages are therefore produced across the secondary 83 when the signal to which the secondary is tuned is applied. These voltages are rectified by the diodes 84 and 85 with the bias between the rectified voltages being proportional to the deviation of the applied frequency from the frequency to which the secondary 83 is tuned. This is the usual Seeley-Foster discriminator operation. The output of the discriminator is applied to triode 86 which operates as an audio amplifier with the output signal bebeing applied through the filter including resistor 87 and the condenser 88 to poteniometer 89. The variable tap on potentiometer 89 provides a volume control for the audio signal.

When the carrier is shifted by the subcarrier transmitter by the application of a bias voltage thereto, as previously described, the voltage applied to the audio amplifier 86 is not controlled by the potentiometer 89. This is because a condenser 91 is provided in series with the potentiometer 89 so that the potentiometer is not grounded for direct current signals. The filter including resistor 87 and condenser 88 also does not operate on the direct current voltage so that it is not attenuated thereby. An additional resistor 92 is bridged from the output of the discriminator to the bottom terminal of the potentiometer 89 to further reduce the resistance of the coupling between the discriminator and the output amplifier. The signal from the discriminator resulting from the frequency shift is large and biases off the output amplifier 86. This is true when the frequency shift is keyed at a rate of the order of 20 cycles per second as required for responding to dial pulses.

An additional triode section 95 is provided in the subcarrier receiver, which may provide a direct current control. This triode has the control grid thereof connected through resistor 96 to the output of the limiter 76 so that the grid will be biased in accordance with the carrier signal received. Accordingly when a strong carrier wave is received on the frequency to which the receiver is tuned, the triode 95 will be biased off but the triode 86 will be conducting. However, when the signal received is shifted in frequency, the triode 86 will be biased off due to the signal applied thereto by the discriminator.

Figure 4:
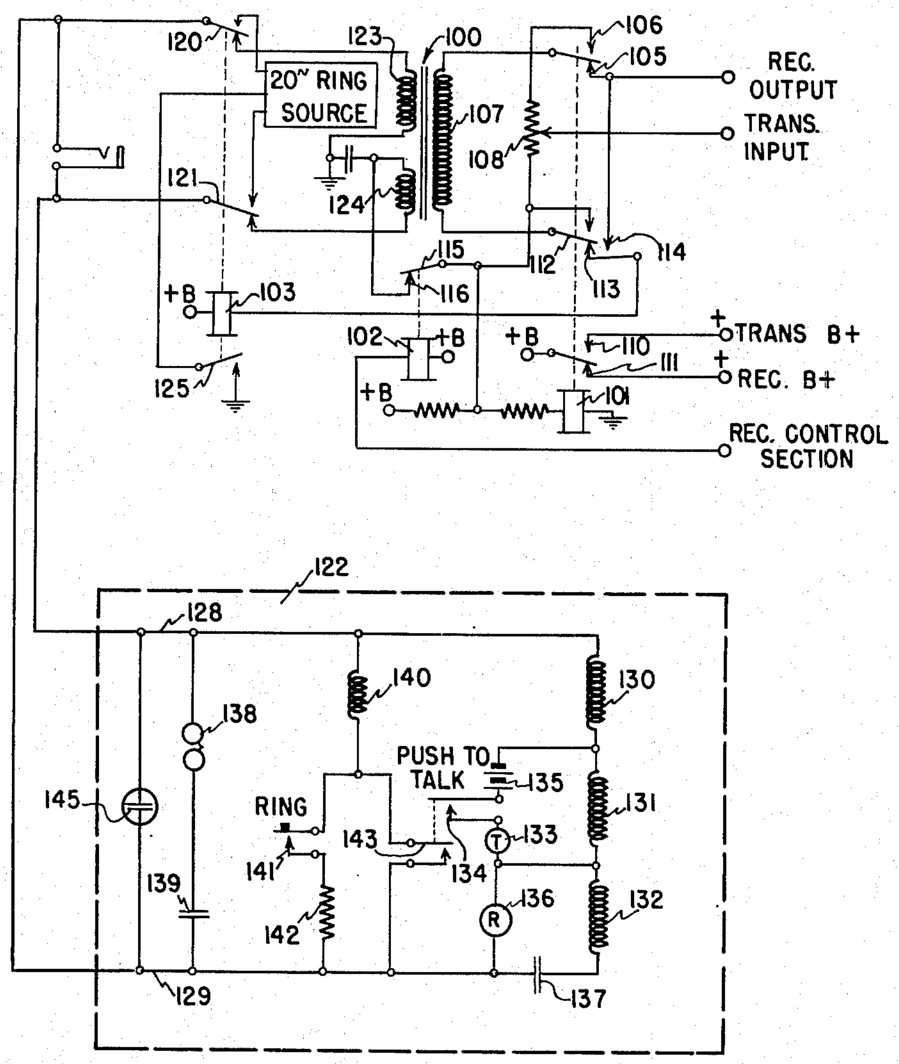
Fig. 4 illustrates a party line terminal and telephone subset for use therewith.

In Fig. 4 there is illustrated the circuit of the party line terminal which may be connected to the subcarrier transmitter and receiver at any station in the multiplex system. This terminal is indicated at 17 in Fig. 1. Fig. 4 includes also the circuit of a subset suitable for use with the party line terminal. This terminal includes a transformer 100 and relays 101, 102 and 103. The terminal is connected to the receiver output through contact 105 associated with the relay 101 and to the transmitter input through the contact 106 of this relay. With the relay energized, as shown, the signals from the receiver output are applied to the winding 107 of the transformer. The relay 101 also includes terminals 111 and 110 for applying +B potential selectively to the receiver and the transmitter. When the relay is energized, as shown, the +B potential is applied to the receiver. When the relay 101 is deenergized the winding 107 of the transformer 100 is connected to the potentiometer 108 and the variable tap thereon is connected to the transmitter input. +B potenetial is applied to the transmitter through contact 110. When the relay 101 is actuated the movable arm 112 thereof will engage the contact 113 which is also movable so that it can move away from the contact 114. However, contact will be made between the arm 112 and the contact 113 before the contacts 113 and 114 are broken. The purpose of this action will be described hereinafter.

A lockout relay 102 is provided which may be connected to the plate terminal of the triode 95 of the subcarrier receiver illustrated in Fig. 2. While this circuit is conducting, the relay 102 will be energized and the contacts 115 and 116 of the lockout relay 102 will be held in engagement. The relay 103 is designated the ringing relay and includes movable arms 120 and 121 for connecting the lines 128 and 129 extending to the subset 122 alternatively to the windings 123 and 124 of the transformer 100 or to a source of 20-cycle ringing current. An additional movable contact 125 is provided for controlling the operation of the 20-cycle source.

The subset 122 is of the local battery type having a plurality of coils 130, 131 and 132 connected across the lines 128 and 129 and with the telephone transmitter 133 connected through contacts 134 of the push-to-talk switch and in series with battery 135 across the coil 131. The receiver 136 is connected across the coil 132 in series with condenser 137. For signalling the party line stations, a ringer 138 is connected in series with condenser 139 across the lines 128 and 129. A holding coil 140 is connected in series with a ringing key 141 and resistance 142 across the lines, with the contacts 143 of the push-to-talk switch being bridged across the ring key 141 and the resistor 142. For indicating when the party line is not in use, a neon bulb 145 may be connected across the lines 128 and 129.

Considering now the operation of the party line terminal, when the system is in the normal position for receiving, the push-to-talk relay 101 will be energized by the current from the +B source. The lockout relay 102 is energized by the direct current from the control section of the subcarrier receiver. This relay applies potential to the lines so that the neon bulb 145 is lit. The receiver ring relay is energized by the current from +B through the winding of the relay 103 and through the output stage of the receiver. The signals from the receiver output will therefore be transferred through the transformer 100 to the lines 128 and 129, and will be reproduced by the receiver 136. When it is desired to transmit, the push-to-talk switch is pressed connecting the audio transmitter 133 in series with the battery 135 to the line and causing operation of the push-to-talk relay. The push-to-talk relay is deenergized as the holding coil 140 is shorted across the lines and shunts the winding of the relay 101. This also extinguishes the neon bulb 145. The receiver ring relay remains energized since it is connected to the receiver output through the contacts 113 and 114. Signals from the transmitter 133 will therefore be transferred through transformer 100 to the potentiometer 108 and applied to the transmitter input. The transmitter will be energized through the contact 110.

When it is desired to signal another party this can be accomplished by operating the ringing key 141. In this condition the push-to-talk relay will be shunted through the holding coil 140 and the resistance 142 which causes the push-to-talk relay to be deenergized. There is a small voltage across the resistance 142, however, which is applied through contact 121 of the ringing relay 103 and through contacts 115 and 116 of the lockout relay 102 to the transmitter input. This provides a direct current bias to the transmitter which shifts the frequency thereof in the manner previously described. The shifted frequency is effective to bias off the output of the receivers which operate in the system. When the receiver output is thus biased off the ring relay 103 in the terminal is deenergized and the 20-cycle ringing source is applied to the lines 128 and 129 to actuate the ringer 138.

When the party line terminal is in receiving condition the operation of any transmitter on the party line deenergizes the lockout relay so that the station cannot transmit. This is accomplished because the presence of a carrier in the receiver biases off the D. C. control stage so that current through the relay 102 is interrupted. The contacts 115 and 116 will therefore open so that the push-to-talk relay cannot be shunted by the push-to-talk switch to apply a signal to the transmitter input. Therefore when any one station in the party line system is transmitting the other stations will be locked out and cannot interrupt. The neon bulb 145 will be extinguished when any station is transmitting to indicate this condition to the operator.

Figure 5:
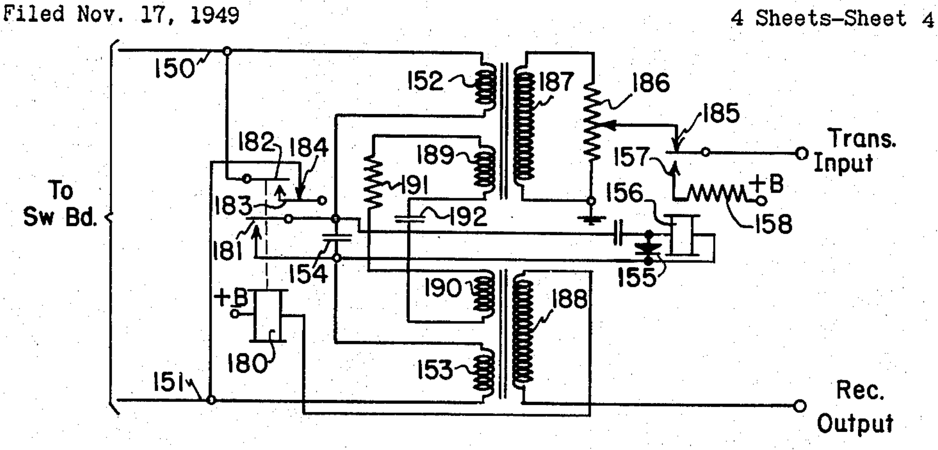
Fig. 5 illustrates a terminal for connecting a dial telephone switchboard to the radio communication system.
Figure 6:
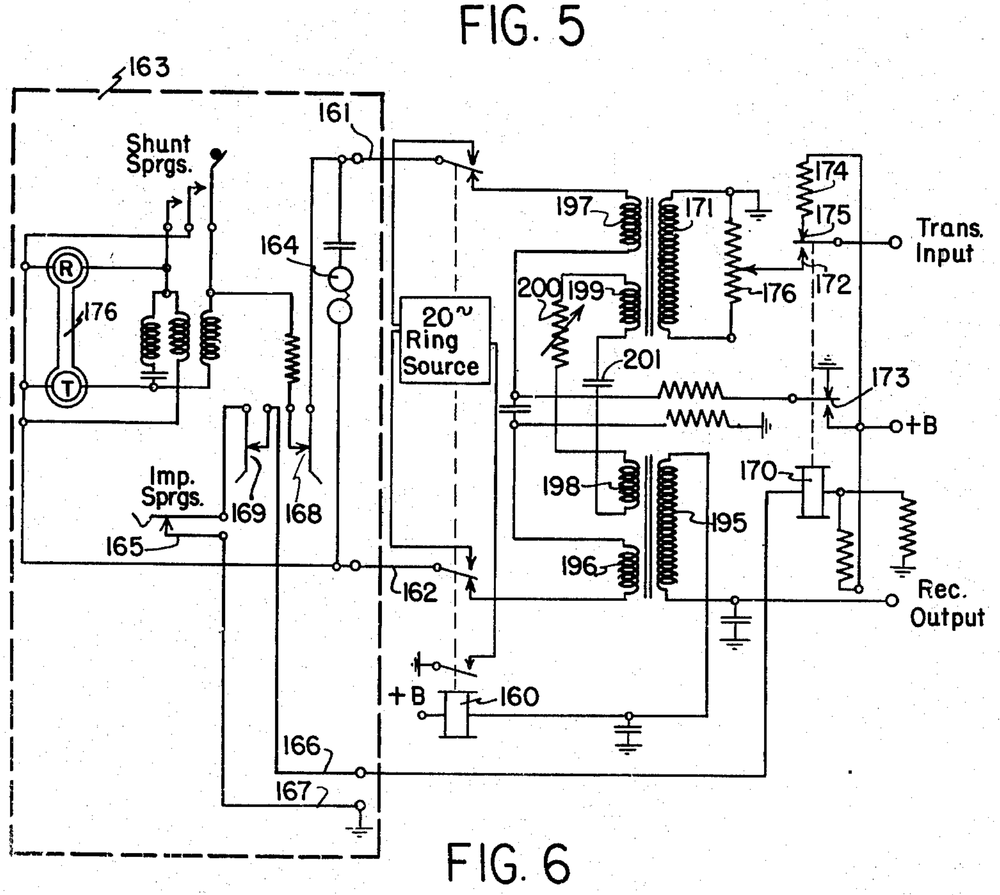
Fig. 6 illustrates a terminal circuit for connecting a dial telephone subset to the radio communication system.

Reference is now made to Figs. 5 and 6 which illustrate the terminal equipment necessary for dial telephone operation. Fig. 5 illustrates the terminal equipment required at the switchboard and Fig. 6 illustrates the terminal equipment required at a substation together with a suitable substation circuit. These systems include hybrid coils so that transmission and reception can be provided by a single pair of wire lines. These two circuits will be described together as the operation thereof are closely interrelated.

When it is desired to call the substation from the switchboard a ringing voltage will be applied from the switchboard to the lines 150 and 151 (Fig. 5). This voltage is applied through windings 152 and 153 of the hybrid across condenser 154 and is rectified by rectifier 155 to energize the ring relay 156. The relay 156 when energized connects the transmitter input to the contact 157 which is connected to +B through resistor 158. A direct current bias is thereby applied to the transmitter input which shifts the frequency of the transmitter in the manner previously explained. The shifted frequency of the transmitter biases off the receiver output so that the ring relay 160 at the substation (Fig. 6) is deenergized and the lines 161 and 162 connected to the subset 163 are connected to the 20-cycle ringing source. This causes the ringer 164 at the subset to be energized signalling the operator at this station. In response to the signal the operator removes his handset from its hook which operates switches 168 and 169 to connect the handset 176 to lines 161 and 162 and to connect the dial switch 165 to the lines 166 and 167. The switches 168 and 169 are shown in the closed position assumed when the handset is removed from the hook. The dial switch 165 completes the circuit through the relay 170 and the relay operates to connect the transmitter input to the winding 171 through contact 172 and connects the contact 173 to +B to provide a voltage on the line 161 for energizing the transmitter of the handset 176.

The subcarrier transmitter at the substation is normally biased off frequency by the voltage from +B which is applied through resistor 174 and the contact 175 of relay 170. When the handset 176 is removed, switch 169 energizes the relay 170 to connect the transmitter input to contact 172 and put the transmitter back on frequency so that the receivers operating therewith will not be biased off. The current from the output stage of the receiver will energize the relay 180 at the switchboard terminal to close contacts 181 which shunt condenser 154, and to momentarily short the lines 150 and 151 through the contacts 182, 183 and 184. The contacts 181 will deenergize relay 156 so that the transmitter input will be connected through contact 185 and potentiometer 186 to the winding 187 of the hybrid coil. The contact 182 is moved into engagement with the contact 183 when the relay 180 operates to momentarily short the lines 150 and 151 with the contacts 183 and 184 subsequently being broken as the contact 182 is moved further so that the short across the lines is removed. This shorting of the lines 150 and 151 provides a signal at the switchboard.

With the terminal equipment in the condition stated above, communication may be carried on between the switchboard and the substation through the subcarrier transmitters and receivers. The transmitter at the switchboard is connected to the winding 187 of the hybrid which is coupled to winding 152 connected to the switchboard. The receiver output is applied to the winding 188 of the hybrid which is coupled through winding 153 to the switchboard. The hybrid includes windings 189 and 190 connected in a closed circuit through resistor 191 and condenser 192. This circuit is effective to balance out signals induced in the winding 187 from the winding 188 through action of the series connected windings 152 and 153 so that the received signal is not applied to the transmitter. Similarly at the substation the receiver output is connected to the winding 195 which is coupled to the winding 196 connected to the lines 161 and 162. Transmitted signals are applied from the winding 197 to the winding 171 which is coupled through potentiometer 176 and contact 172 to the transmitter input. The hybrid coils include windings 198 and 199 connected in series through resistor 200 and condenser 201 to balance out the effect of received signals coupled through the windings 196 and 197 to the winding 171. This is the normal operation of such hybrid units.

When it is desired to originate a call from the substation the handset 176 is removed from the hook to close switches 168 and 169. This energizes the relay 170 to return the subcarrier transmitter at the substation to center frequency and causes the switchboard to be signalled by operation of relay 180 in the manner previously described. The switchboard will, therefore, recognize the call by applying the dial tone. The party at the substation can then begin dialing which intermittently opens the switch 165 to interrupt the relay 170. This action alternately places the transmitter on and off frequency to provide intermittent biasing of the output circuit of the receiver causing the relay 180 in the switchboard terminal to follow the dialing operations. As previously stated, this relay operates to momentarily completely shunt the lines 150 and 151 to operate the dial switchboard equipment. The dial switchboard equipment then operates in the normal way to connect the desired party to the lines 150 and 151 for communication with the operator at the substation.

It is apparent from the above that the control provided through the subcarrier transmitters and receivers may be used to operate terminal equipment for providing both party line and dial operation. The special construction of the subcarrier transmitter so that a bias voltage may be applied thereto to provide a shift of the carrier frequency, and the special construction of the subcarrier receiver whereby this shift of the frequency biases off the audio stage, permits the required control over radio systems. By use of this equipment a narrow channel provides voice transmission and also the control necessary for signaling and switching. The system, therefore, permits the use of a channel of a multiplex system for providing the desired telephone circuits.

Although certain embodiments of the invention which are illustrative thereof have been described, it is obvious that various changes and modifications can be made therein without departing from the intended scope of the invention as defined in the appended claims.

I claim:

1. A communication system operating over a relatively wide band of frequencies and within which a plurality of transmissions simultaneously take place comprising, transmitting means for frequency modulating a subcarrier wave by a low frequency signal wave, said transmitting means shifting the frequency of said subcarrier wave by a substantial amount in response to the application thereto of a direct current potential having a greater voltage than that of said low frequency signal wave, and receiving means for receiving said subcarrier wave, said receiving means including discriminator means, audio amplifier means, and a coupling circuit therebetween, said discriminator means providing a voltage varying in accordance with the deviation of said subcarrier wave from the center frequency thereof, said coupling circuit substantially attenuating alternating currents produced by said discriminator means in response to modulation of said subcarrier wave by said signal wave, said coupling circuit applying the direct current voltage produced by said discriminator means in response to frequency shift of said subcarrier wave to said audio amplifier means without attenuation to thereby block said audio amplifier means.

2. A communication system operating over a relatively wide band of frequencies and within which a plurality of transmissions simultaneously take place comprising, transmitting means including means for producing a subcarrier wave and means for frequency modulating the same in response to the application of a voltage thereto, said transmitting means including an input circuit for amplifying alternating current signals and for applying direct current signals directly to said modulating means to shift the frequency of said subcarrier wave, and receiving means for receiving said subcarrier wave, said receiving means including discriminator means, audio amplifier means, and a coupling circuit therebetween, said discriminator means providing a voltage varying in accordance with the deviation of said subcarrier wave from the center frequency thereof, said coupling circuit substantially attenuating alternating currents produced by said discriminator means in response to modulation of said subcarrier wave by said alternating current signals, said coupling circuit applying the direct current voltage produced by said discriminator means in response to said frequency shift of said subcarrier wave to said audio amplifier means without attenuation to thereby block said audio amplifier means.

3. A communication system operating over a relatively wide band of frequencies and within which a plurality of transmissions simultaneously take place comprising, transmitting means for frequency modulating a subcarrier wave by a low frequency signal wave, said transmitting means shifting the frequency of said subcarrier wave by a substantial amount in response to the application thereto of a direct current potential having a greater voltage than that of said low frequency signal wave, and receiving means for receiving said subcarrier wave, said receiving means demodulating said subcarrier wave to derive said alternating current signals therefrom and to provide a direct current voltage in response to said shift of said subcarrier wave, said receiving means including an output stage which amplifies said alternating current signals and which is blocked by said direct current voltage.

4. A communication system comprising, transmitting means for frequency modulating a subcarrier wave in accordance with the voltage applied thereto, said transmitting means including means for amplifying alternating current signals applied thereto and for shifting the frequency of said subcarrier wave in response to the application of a direct current potential thereto, and receiving means for receiving said subcarrier wave, said receiving means demodulating said subcarrier wave to derive said alternating current signals therefrom and to provide a direct current voltage in response to said shift of said subcarrier wave, said receiving means including an output stage which amplifies said alternating current signals and which is blocked by said direct current voltage.

5. A communication system comprising, transmitting means including means for producing a carrier wave and means for frequency modulating the same in response to the application of a voltage thereto, said transmitting means including an input circuit having amplifying means for applying an alternating current signal wave to said modulating means and having attenuating means for applying direct current signals to said modulating means to shift the frequency of said carrier wave, and receiving means for receiving said carrier wave, said receiving means including discriminator means, audio amplifier means, and a coupling circuit therebetween, said discriminator means providing a voltage varying in accordance with the deviation of said carrier wave from the center frequency thereof, said coupling circuit substantially attenuating alternating current voltages produced by said discriminator means in response to modulation of said carrier wave by said signal wave, said coupling circuit applying direct current voltages produced by said discriminator means in response to said frequency shift of said carrier wave to said audio amplifier means without attenuation to thereby block said audio amplifier means.

6. A party line telephone system operating over a radio channel including in combination, a terminal unit and transmitting means and receiving means coupled to said terminal unit, said terminal unit including means for selectively energizing said transmitting means and for selectively applying an audio wave and a direct current signalling potential to said transmitting means when said transmitting means is energized, said transmitting means including means for producing a carrier wave and means for frequency modulating said carrier wave by an audio wave and for shifting the frequency of said carrier wave in response to the application of said direct current signalling potential thereto, said receiving means demodulating the frequency modulated carrier wave of a predetermined frequency received thereby to derive said audio wave therefrom and to provide a direct voltage in response to said frequency shift of said carrier wave, said receiving means having an output stage which amplifies the recovered audio wave and having a portion which is blocked in response to said derived direct voltage, said receiving means having a control stage which is rendered non-conducting when a signal of said predetermined frequency is received thereby, said terminal unit including first circuit means coupled to said output stage which provides a signal in response to the blocking of said output stage and second circuit means connected to said control stage which prevents energization of said transmitting means when a signal of said predetermined frequency is received by said receiving means.

7. A dial telephone system including in combination, first and second terminal units, transmitting means coupled to said first terminal unit, and receiving means coupled to said second terminal unit, said first terminal unit selectively applying an audio wave and dial pulses in the form of direct current signals recurring at a frequency of the order of twenty cycles per second to said transmitting means, said transmitting means including means for producing a carrier wave and means for frequency modulating said carrier wave by said audio wave and for shifting the frequency of said carrier wave in response to said direct current signals, said receiving means including discriminator means, audio amplifier means, and a coupling circuit therebetween, said discriminator means providing a voltage varying in accordance with the deviation of the received carrier wave from the center frequency thereof, said discriminator voltage corresponding to said audio frequency waves and to said direct current signals applied to said modulating means, said coupling circuit including a path for the audio frequency wave produced by said discriminator means which attenuates said audio frequency wave, said coupling circuit including another path which provides a low impedance for the recurring direct current voltages produced by said discriminator means in response to said frequency shift of said carrier wave so that said direct current voltages block said audio amplifier means, said second terminal unit including a circuit coupled to said audio amplifier means which provides a signal pulse in response to the blocking of said amplifier means.

8. A telephone system including in combination, first and second terminal units, transmitting means coupled to said first terminal unit, and receiving means coupled to said second terminal unit, said first terminal unit selectively applying an audio wave and direct current calling signals to said transmitting means, said transmitting means including means for producing a carrier wave and means for frequency modulating said carrier wave by said audio wave and for shifting the frequency of said carrier wave in response to said direct current signals, said receiving means including discriminator means, audio amplifier means, and a coupling circuit therebetween, said discriminator means providing a voltage varying in accordance with the deviation of said carrier wave from the center frequency thereof, said discriminator voltage corresponding to said audio frequency waves and to said direct current signals applied to said modulating means, said coupling circuit including circuit portions providing a path for the audio frequency wave produced by said discriminator means which attenuates said audio frequency wave and circuit portions which provide a low impedance path for the direct current voltages produced by said discriminator means in response to said frequency shift of said carrier wave so that said direct current voltages block said audio amplifier means, said terminal means including a circuit coupled to said audio amplifier means which provides a calling signal in response to the blocking of said amplifier means.

9. A dial telephone system including in combination, first and second terminal units, transmitting means and receiving means coupled to each of said terminal units with said transmitting means of said first terminal unit communicating with said receiving means of said second terminal unit and said transmitting means of said second terminal unit communicating with said receiving means of said first terminal unit, said first terminal means selectively applying an audio wave and dial pulses in the form of direct current signals recurring at a frequency of the order of twenty cycles per second to said transmitting means connected thereto, said transmitting means including means for producing a carrier wave and means for frequency modulating said carrier wave by said audio wave and for shifting the frequency of said carrier wave in response to said direct current signals, said receiving means including discriminator means, audio amplifier means, and a coupling circuit therebetween, said discriminator means providing a voltage varying in accordance with the deviation of the received carrier wave from the center frequency thereof, said discriminator voltage corresponding to said audio frequency waves and to said direct current signals applied to said modulating means, said coupling circuit including circuit portions providing a path for the audio frequency wave produced by said discriminator means which attenuate said audio frequency wave and circuit portions which provide a low impedance path for the receiving direct current voltages produced by said discriminator means in response to frequency shift of said carrier wave so that said direct current voltages block said audio amplifier means, said terminal means including a circuit coupled to said audio amplifier means which provides a signal in response to the blocking of said amplifier means.

10. A dial telephone system including in combination, first and second terminal units, transmitting means and receiving means connected to each of said terminal units with said transmitting means of said first terminal unit communicating with said receiving means of said second terminal unit and said transmitting means of said second terminal unit communicating with said receiving means of said first terminal unit, each of said transmitting means including means for producing a carrier wave and means for frequency modulating said carrier wave by an audio frequency wave and for shifting the frequency of said carrier wave in response to a direct current signal, each of said receiving means including means for demodulating the received frequency modulating carrier wave and having an output stage which amplifies audio frequency waves derived thereby and which is blocked in response to a shift of the carrier wave, said first terminal unit including means for selectively applying an audio frequency wave and dial pulses in the form of recurring direct current voltages to said transmitting means connected thereto, said second terminal unit including a circuit coupled to said output stage of the receiver connected thereto to receive said audio frequency wave from said first terminal unit and to provide signal pulses in response to the blocking of said output stage by the dial pulses from said first terminal unit, said second terminal unit including means for selectively applying an audio frequency wave and a steady direct current calling signal to the transmitter connected thereto, and said first terminal unit including a circuit coupled to said output stage of the receiver connected thereto to receive said audio frequency wave from said second terminal unit and to provide a calling signal at said first terminal unit in response to the blocking of said output stage by the direct current calling signal from said second terminal unit.

11. A dial telephone system including in combination, first and second terminal units, transmitting means and receiving means connected to each of said terminal units with said transmitting means of said first terminal unit communicating with said receiving means of said second terminal unit and said transmitting means of said second terminal unit communicating with said receiving means of said first terminal unit, each of said transmitting means including means for producing a carrier wave and means for frequency modulating said carrier wave by an alternating current signal and for shifting the frequency of said carrier wave in response to a direct current signal, each of said receiving means including means for deriving signals from the received frequency modulating carrier wave and having an output stage which amplifies audio waves derived thereby and which is blocked in response to a shifted carrier wave, said first terminal unit including means for applying dial pulses in the form of recurring direct current signals to said transmitting means connected thereto to intermittently shift the frequency thereof, said second terminal units including a circuit coupled to said output stage of the receiver connected thereto to provide signal pulses in response to the intermittent blocking of said output stage, said second terminal unit including means for applying a steady direct current calling signal to the transmitter connected thereto to shift the frequency thereof, and said first terminal unit including a circuit coupled to said output stage of the receiver connected thereto and providing a calling signal in response to the blocking of said output stage by the calling signal from said second terminal unit.

12. A dial telephone system including in combination, first and second terminal units, transmitting means and receiving means coupled to each of said terminal units and intercommunicating with each other, each of said transmitting means including means for producing a carrier wave and means for frequency modulating said carrier wave by an audio frequency wave and for shifting the frequency of said carrier wave in response to a direct current signal, each of said receiving means including means for demodulating the received frequency modulating carrier wave, an output stage and a circuit for interconnecting the same which attenuates the audio frequency waves and which applies direct current signals derived from the shifted carrier wave without attenuation to thereby block said output stage, said first terminal unit including means for selectively applying an audio wave and dial pulses in the form of recurring direct current voltages to said transmitting means connected thereto, said second terminal unit including a circuit coupled to said output stage of the receiver thereof to receive said audio wave and to provide signal pulses in response to the blocking of said output stage, said second terminal unit including means for selectively providing an audio wave and a steady direct current calling signal to the transmitter connected thereto, and said first terminal unit including a circuit coupled to said output stage of the receiver connected thereto to receive said audio wave and to provide a calling signal in response to the blocking of said output stage.

13. A communication system for sequentially transmitting signal waves and control voltages including in combination, transmitting means including means for producing a carrier wave and means for frequency modulating the same in response to the application of a voltage thereto, said transmitting means including an input circuit having amplifying means for applying an alternating current signal wave to said modulating means and having attenuating means for applying direct current control voltage to said modulating means to shift the frequency of said carrier wave, and receiving means for receiving said carrier wave, said receiving means including discriminator means, output circuit means, and a coupling circuit coupling said output circuit means to said discriminator means, said discriminator means providing a voltage varying in accordance with the deviation of said carrier wave from the center frequency thereof, said coupling circuit attenuating alternating current voltages produced by said discriminator means in response to modulation of said carrier wave by said signal wave and applying the same to said output circuit means, said coupling circuit applying direct current voltages produced by said discriminator means in response to said frequency shift of said carrier wave to said output circuit means, said output circuit means having a portion thereof blocked by said direct current voltage to produce control voltages so that both said signal wave and said control voltages are reproduced in said output circuit means.

14. A communication system including in combination, transmitting means including means for producing a carrier wave, means for frequency modulating said carrier wave in response to the application of signal voltages thereto, and an input circuit having circuit portions forming a first path for applying audio frequency waves to said modulating means and having circuit portions forming a second path for applying direct current signals to said modulating means at a reduced level to shift the frequency of said carrier wave, and receiving means for receiving said carrier wave, said receiving means including discriminator means, output circuit means, and a coupling circuit interconnecting said discriminator means and said output circuit means, said discriminator means providing a voltage varying in accordance with the derivation of said carrier wave from the center frequency thereof and reproducing said audio frequency waves and said direct current signals applied to said modulating means, said coupling circuit including circuit portions providing a path for said reproduced audio frequency wave produced by said discriminator means, and circuit portions providing a low impedance path for reproduced steady and intermittent direct current voltages produced by said discriminator means in response to frequency shift of said carrier wave, said output circuit means amplifying said reproduced audio frequency waves and producing control voltages in response to the reproduced direct current voltages.

15. A communication system including in combination, terminal means, tranmitting means and receiving means coupled to said terminal means, said terminal means selectively applying an audio wave and a direct current signalling potential to said transmitting means, said transmitting means including means for producing a carrier wave and means for frequency modulating said carrier wave by said audio wave and for shifting the frequency of said carrier wave in response to said direct current potential, said receiving means demodulating the carrier wave received thereby to derive said audio wave therefrom and to provide a direct current voltage in response to frequency shift of the received carrier wave, said receiving means having an output stage which amplifies the recovered audio wave and applies the same to said terminal means, said output stage including a portion which is blocked by said direct current voltage to produce a direct current signalling potential for said terminal means.

16. A party line telephone system operating over a radio channel including in combination, a terminal unit and transmitting means and receiving means coupled to said terminal unit, said terminal unit including means for selectively energizing said transmitting and said receiving means and for selectively applying an audio wave and a direct current signalling potential to said transmitting means when said transmitting means is energized, said transmitting means including means for producing a carrier wave and means for frequency modulating said carrier wave by said audio wave and for shifting the frequency of said carrier wave in response to the application of said direct current signalling potential thereto, said receiving means demodulating the frequency modulated carrier wave received thereby to derive said audio wave therefrom and to provide a direct current voltage in response to frequency shift of the received carrier wave, said receiving means having an output stage which amplifies the recovered audio wave and including a portion which is blocked in response to said direct current voltage, said terminal unit including circuit means coupled to said output stage which provides a signal in response to the blocking of said output stage.

17. In a frequency modulation communication system wherein a carrier wave is sequentially frequency modulated by audio frequency waves, and shifted in frequency to provide control functions, receiving means for receiving the carrier wave including in combination, discriminator means, output circuit means including audio amplifier means, and a coupling circuit connected between said discriminator means and said output circuit means, said dicriminator means providing a voltage varying in accordance with the deviation of said carrier wave from the center frequency thereof, said discriminator producing a voltage corresponding to said audio frequency wave in response to frequency modulation of said carrier wave and producing a direct current voltage in response to a shift of the frequency of said carrier wave, said coupling circuit including circuit portions providing a first path for audio frequency waves produced by said discriminator means which attenuates the same and a second low impedance path for steady and intermittent direct current voltages produced by said discriminator means in response to frequency shift of said carrier wave, said output circuit means amplifying audio frequency waves applied thereto and producing control voltages in response to said direct current voltages applied thereto.

18. In a frequency modulation communication system, transmitting means for sequentially handling alternating current signal waves and direct current control voltages including in combination, input terminals, oscillator means for producing a carrier wave, modulating means coupled to said oscillator means for frequency modulating the same, an input circuit coupling said input terminals to said modulating means, said input circuit having circuit portions including an electron discharge valve providing a path to said modulating means for alternating current signal waves applied to said input terminals, said input circuit having circuit portions providing a second path to said modulating means for direct current control voltages applied to said input terminals, said modulating means providing frequency deviation of said carrier wave in response to said signal waves and shifting the frequency of said carrier wave in response to said control voltages, said second circuit portion controlling the amplitude of the direct current control voltages applied to said modulating means so that the frequency of said carrier wave is shifted thereby to a greater extent than the deviation thereof produced by the alternating current signal waves.

References Cited in the file of this patent

UNITED STATES PATENTS

| Number | Name | Date |
|---|---|---|
| 1,624,506 | Pruden | Apr. 12, 1927 |
| 2,263,633 | Koch | Nov. 25, 1941 |
| 2,299,487 | Moore | Oct. 20, 1942 |
| 2,315,050 | Crosby | Mar. 30, 1943 |
| 2,333,992 | Fox | Nov. 9, 1943 |
| 2,349,870 | Koch | May 30, 1944 |
| 2,371,397 | Koch | Mar. 13, 1945 |
| 2,383,908 | Bowers | Aug. 28, 1945 |
| 2,413,296 | Deal et al. | Dec. 31, 1946 |
| 2,457,434 | Bartelink | Dec. 28, 1948 |